United States Patent

Kohzu

[11] Patent Number: 5,870,913
[45] Date of Patent: Feb. 16, 1999

[54] KEY DEVICE FOR A VEHICLE

[75] Inventor: Tadao Kohzu, Saitama, Japan

[73] Assignee: Kansei Corporation, Saitama, Japan

[21] Appl. No.: 728,071

[22] Filed: Oct. 9, 1996

[30] Foreign Application Priority Data

Oct. 9, 1995 [JP] Japan .................................. 7-261851

[51] Int. Cl.$^6$ ............................ E05B 49/00; B60R 25/04
[52] U.S. Cl. .............................. 70/278; 70/413; 307/10.3
[58] Field of Search ............................ 70/413, 276, 278, 70/277; 307/10.3, 10.6

[56] References Cited

U.S. PATENT DOCUMENTS

| | | | |
|---|---|---|---|
| 4,145,725 | 3/1979 | Wallis | 360/106 |
| 4,849,749 | 7/1989 | Fukamachi et al. | 70/413 |
| 4,918,955 | 4/1990 | Kimura et al. | 70/413 |
| 4,953,123 | 8/1990 | Takeuchi et al. | 365/66 |
| 5,307,658 | 5/1994 | Kobubu et al. | 70/276 |
| 5,351,042 | 9/1994 | Aston | 70/278 |
| 5,469,727 | 11/1995 | Spahn et al. | 70/413 |
| 5,679,984 | 10/1997 | Talbot et al. | 307/10.3 |

FOREIGN PATENT DOCUMENTS

| | | | |
|---|---|---|---|
| 4-15141 | 3/1992 | Japan . | |
| 2187227 | 9/1987 | United Kingdom | 70/276 |
| 2198779 | 6/1988 | United Kingdom | 70/276 |

*Primary Examiner*—Darnell M. Boucher
*Attorney, Agent, or Firm*—Sughrue, Mion, Zinn, Macpeak & Seas, PLLC

[57] ABSTRACT

A key device having a key coil (75a) disposed in a key (75) inserted into a key cylinder (2). Vehicle coils (5a to 5d) which are disposed on a vehicle and to be magnetically coupled with the key coil (75a) perform supply of an electric power and air-propagation communication, thereby reading code information transmitted from the key (75a). The coils are configured in such a manner that the vehicle coils (5a to 5d) are disposed in the vicinity of a key insertion slot (2a) of the key cylinder (2) so that an induction magnetic field is generated in a substantially upper half portion of the key insertion slot or in a pair of lateral portions on both the sides of the key cylinder.

9 Claims, 8 Drawing Sheets

KEY DEVICE FOR A VEHICLE

BACKGROUND DESCRIPTION OF THE INVENTION

1. Field of the Invention

The invention relates to a key device for a vehicle which compares ID code information preset in a key with ID code information preset in a vehicle, thereby allowing an engine of the vehicle to be started.

2. Description of the Related Art

FIGS. 13 and 14 show a first prior art key device for a vehicle which is disclosed in, for example, Japanese Patent Examined Publication No. Hei 4-15141. In the figures, reference numeral 51 designates a key cylinder disposed on a cover of a steering column which is not shown. A hole 53 into which a tip portion 52a of a key 52 enters is formed in the key cylinder 51. The key cylinder 51 has an annular fixed rotor case 54. A columnar rotor 55 is rotatably attached into the rotor case 54.

A key insertion slot 56 which communicates with the hole 53 of the key cylinder 51 is formed in the rotor 55. An annular core 57 is disposed in the rotor case 54 surrounding the rotor 55. The annular core 57 is partly exposed toward the inlet of the key insertion slot 56. As illustrated, vehicle coils 58 and 59 are wound on the annular core 57 in the same direction so that induction magnetic fields are generated in a direction perpendicular to the key rotation axis X—X of the key 52.

On the other hand, a stem-like core 60 which cooperates with the annular core 57 to form a magnetic circuit is attached to a grip portion 52b of the key 52. A key coil 61 which is to be magnetically coupled with the vehicle coils 58 and 59 is wound on the stem-like core 60. A series resonance circuit K1 consisting of a capacitor C1 and a coil L1 is connected to the key coil 61. A series resonance circuit K2 consisting of a capacitor C2 and a coil L2 is connected in parallel to the series resonance circuit K1.

The capacitances of the capacitors C1 and C2, and the inductances of the coils L1 and L2 are set in such a manner that the resonance frequencies f1 and f2 of the series resonance circuits K1 and K2 are different from each other.

Next, the operation will be described.

When the key 52 is inserted into the key insertion slot 56 of the key cylinder 51, a signal for ID code detection is supplied to the vehicle coils 58 and 59. The signal is a sinusoidal signal of a constant voltage and its frequency is changed from a lower one to a higher one in a predetermined range. The key coil 61 receives the frequency signal for ID code detection through the annular core 57 and the stem-like core 60. When the frequency of the received signal coincides with one of the resonance frequencies f1 and f2 of the series resonance circuits K1 and K2, a current flowing through the key coil 61 is increased in level.

The vehicle coils 58 and 59 detect the resonance frequencies f1 and f2 at the timing when the current level is increased. The ID code information preset in the key 52 is read on the basis of the detected resonance frequencies f1 and f2. It is judged whether the read ID code information coincides with vehicle ID code information stored in a ROM (not shown) or not. Only when coincidence is attained, a signal allowing the start of the engine is output so that the engine is enabled to be started.

FIGS. 15 and 16 show a second prior art key device for a vehicle which is different from the above-described prior art example. The reference numeral 71 designates a vehicle coil configured by winding a coil wire by a predetermined number of turns in an annular groove which is formed on the outer peripheral face of a cylindrical bobbin 72. The ends 71a and 71b of the vehicle coil 71 are connected to an electric circuit of the vehicle through lead wires 73a and 73b in a terminal section 72a which is integrated with the cylindrical bobbin 72.

The cylindrical bobbin 72 is inserted into a key cylinder 74, thereby causing the terminal section 72a to elongate in parallel with the cylinder axis or the key rotation axis X—X and toward the mounting base of the key cylinder 74. The cylindrical bobbin 72 is engaged with the outer periphery of the key cylinder 74 on the side of a key insertion slot 81, so as to be attached thereto. Therefore, an induction magnetic field generated by the vehicle coil 71 is generated in parallel with the key rotation axis X—X.

The first prior art key device for a vehicle is configured so that the induction magnetic fields due to the vehicle coils 58 and 59 are generated in a direction perpendicular to the key rotation axis. Therefore, the key coil 61 is not magnetically coupled with the vehicle coils 58 and 59 unless the key coil is near the vehicle coils. Consequently, strong induction magnetic fields must be generated. This produces a problem in that the vehicle coils 58 and 59 must have a large number of turns and their sizes are increased.

In the second prior art key device for a vehicle, as shown in FIG. 17, the vehicle coil 71 which is powered by a power supply circuit 78 after a key 75 is inserted into the key insertion slot 81 generates the induction magnetic field in parallel with the key rotation axis X—X. Even a key coil 75a disposed in the key 75 is not near the vehicle coil 71, therefore, the coils can be easily magnetically coupled with each other. When the key cylinder 74 is not disposed horizontally or elongates slantingly, however, the induction magnetic field is at the same time applied also to a key coil 76a disposed in another key 76 for a vehicle which is attached to a key holder 77. Therefore, ID code signal generating circuits 75b and 76b of the two keys 75 and 76 transmit ID code information through the key coils 75a and 76a, and the vehicle coil 71 simultaneously receives the different kinds of code information respectively transmitted from the keys 75 and 76. As a result, an ID code-information receiving and decoding circuit 79 of the vehicle which receives the different kinds of code information produces confusion in the decoding of ID code information, thereby producing a problem in that the decoding cannot be performed.

This problem is particularly noticeable when the key cylinder 74 is disposed slantingly. It is a matter of course that, also when the key cylinder is disposed horizontally, this problem is produced.

SUMMARY OF THE INVENTION

The invention has been conducted in order to solve the problems. It is an object of the invention to provide a key device for a vehicle in which, even when a key for another vehicle is attached to the same key holder, a key coil disposed in the other key is hardly simultaneously subjected to an induction magnetic field and hence the decoding of ID code information is not confused.

It is an object of the invention to provide a key device for a vehicle in which an induction magnetic field is generated at a position where the field acts most easily on a key coil of a key inserted into a key insertion slot.

It is an object of the invention to provide a key device for a vehicle in which an induction magnetic field acts on a key coil from both the front and rear faces of a key.

It is an object of the invention to provide a key device for a vehicle in which a sufficient induction magnetic field can be generated without increasing the size of a vehicle coil.

It is an object of the invention to provide a key device for a vehicle in which a vehicle coil can be easily wound and the vehicle coil can be attached without increasing the size of a key insertion slot of a key cylinder.

It is an object of the invention to provide a key device for a vehicle in which a vehicle coil is thinned.

A vehicle is magnetically coupled with the key coil to perform supply of an electric power and air—propagation communication of an ID code, thereby reading ID code information preset in the key; and a code-information decoding circuit which, only when it is judged that the read ID code information coincides with a preset vehicle ID code information, outputs an engine start signal, wherein the vehicle coils are disposed in the vicinity of a key insertion slot of the key cylinder so that an induction magnetic field is generated in a substantially upper half portion of the key insertion slot or in a pair of lateral portions which are centered on a key rotation axis.

In the key device for a vehicle of the invention, one of induction magnetic fields generated in the pair of lateral portions corresponds to an operation position of the key.

In the key device for a vehicle of the invention, the vehicle coils are a pair of coils respectively disposed on lateral sides which are centered on the key rotation axis.

In the key device for a vehicle of the invention, the vehicle coils are two or more coils which are disposed on each of lateral sides which are centered on the key rotation axis.

In the key device for a vehicle of the invention, the vehicle coils are formed into a cylindrical shape.

In the key device for a vehicle of the invention, the vehicle coils are formed into a square shape.

DETAILED DESCRIPTION OF THE INVENTION

Hereinafter, an embodiment of the invention will be described.

Figure 1:
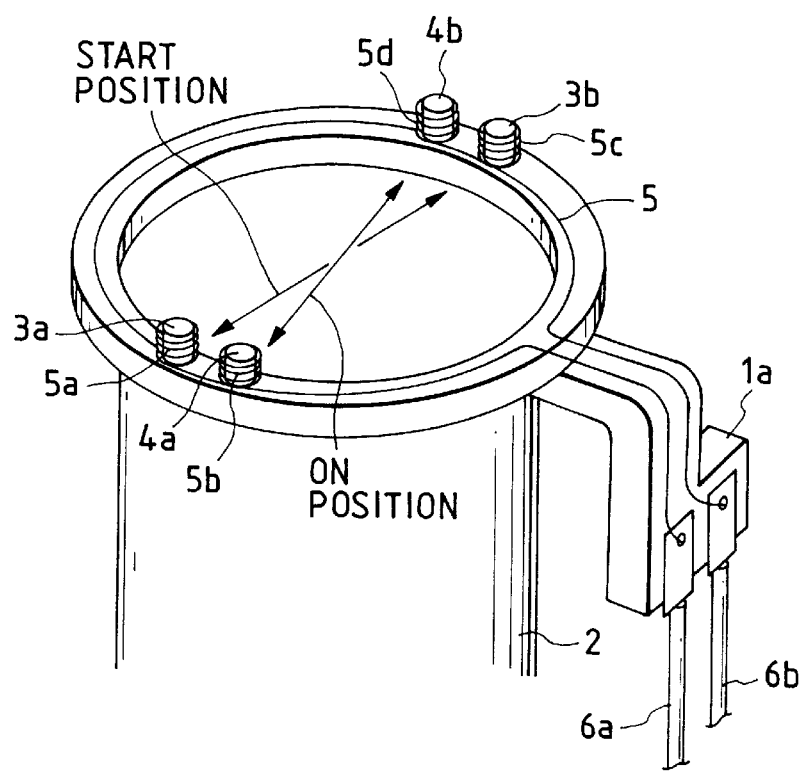
FIG. 1 is a perspective view showing the configuration of vehicle coils of a key device for a vehicle according to Embodiment 1 of the invention.
Figure 2:
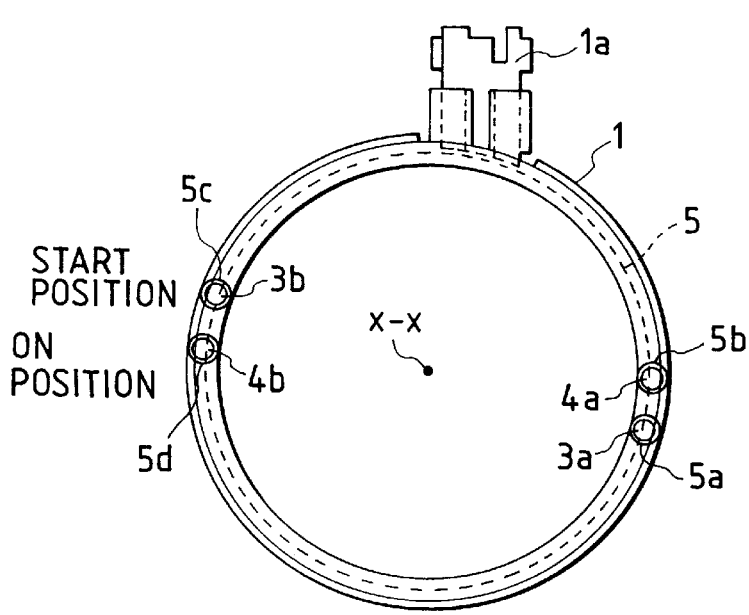
FIG. 2 is a front view showings the vehicle coils of FIG. 1.
Figure 3:
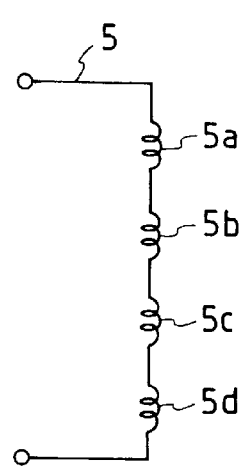
FIG. 3 is a diagram of an equivalent circuit of the vehicle coils of FIG. 1.
Figure 15:
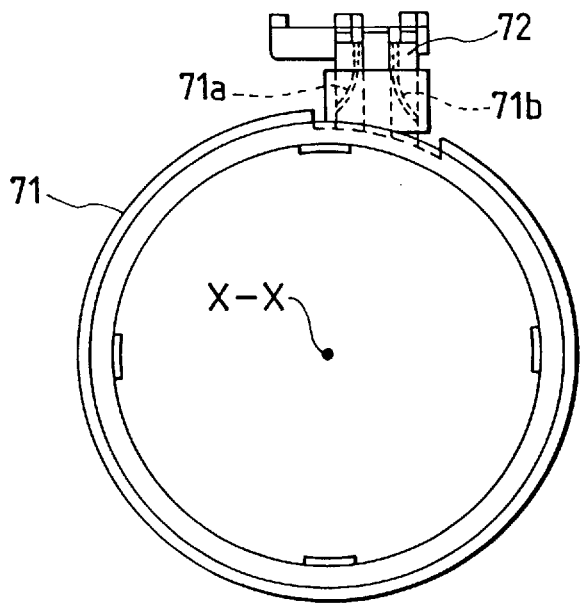
FIG. 15 is front view showing the configuration of a vehicle coil of a second prior art key device for a vehicle.
Figure 16:
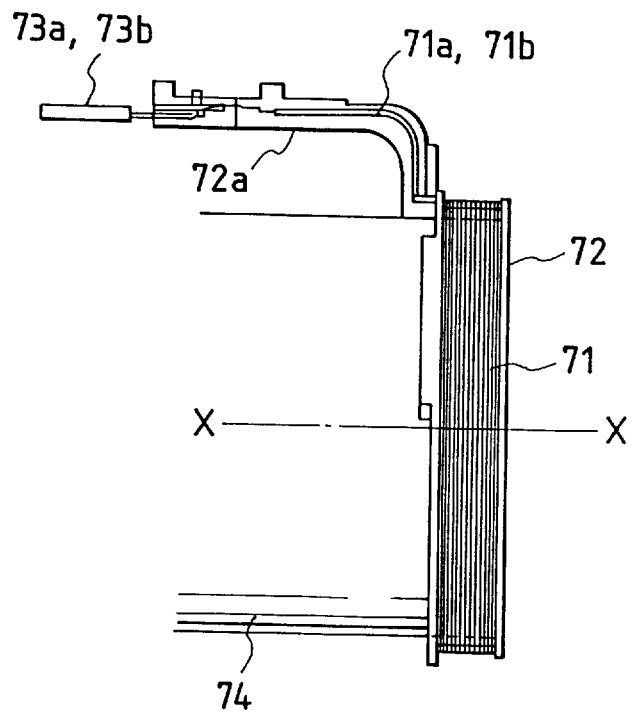
FIG. 16 is a side view showing the vehicle coil of FIG. 15.

In FIGS. 1 and 2, 1 designates a base ring which is to be engagingly attached to an end face of a key insertion slot 2a of a key cylinder 2. An L-shaped terminal section 1a (identical with the terminal section 72a of FIGS. 15 and 16) is integrated with a part of the base ring. The reference numerals 3a, 3b, 4a, and 4b designate-cylindrical cores which are fixed to an end face of the base ring 1 so as to correspond to key operation positions such as START and ON positions, and 5 designates a coil wire. The coil wire 5 is disposed on the end face of the base ring while being wound on each of the cores 3a, 3b, 4a, and 4b by about 40 to 60 turns so as to form vehicle coils 5a, 5b, 5c, and 5d. The ends of the coil wire are connected on the terminal section 1a to a vehicle electric circuit 80 (see FIG. 17) through lead wires 6a and 6b. FIG. 3 shows an equivalent circuit of the vehicle coils 5a to 5d formed by the coil wire 5.

Next, the operation of the first embodiment will be described.

Figure 12:
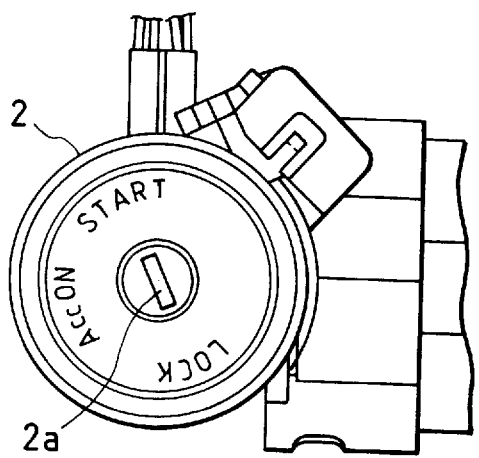
FIG. 12 is a front view showing a key insertion slot of a key cylinder.
Figure 13:
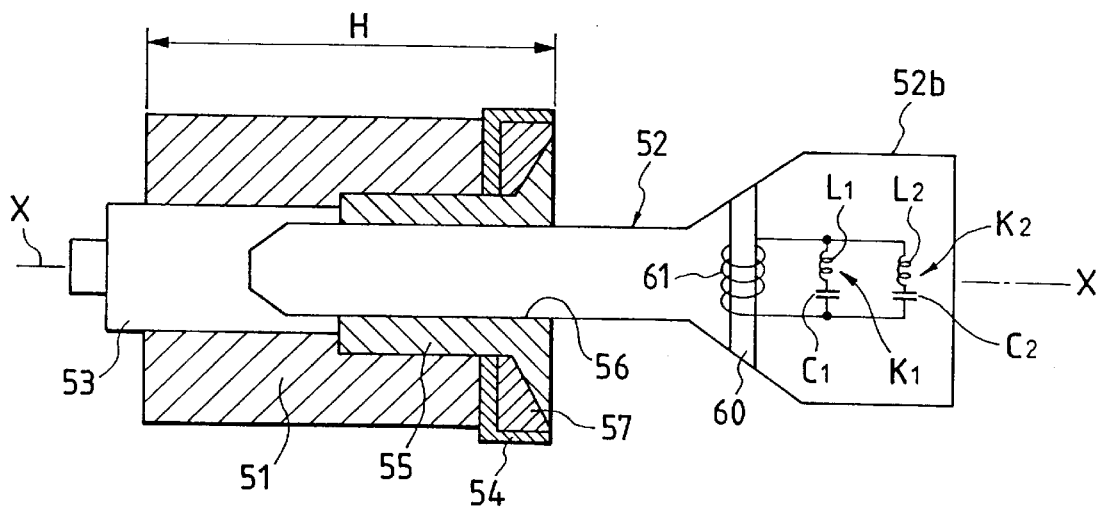
FIG. 13 is a longitudinal section view showing a first prior art key device for a vehicle.
Figure 14:
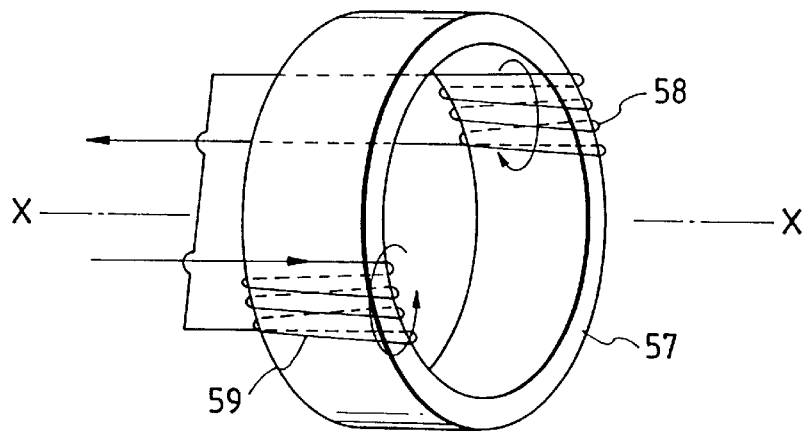
FIG. 14 is a perspective view showing the configuration of vehicle coils of the key device for a vehicle of FIG. 13.

When the key 75 (see FIG. 17) is inserted into the key insertion slot 2a of the key cylinder 2 (see FIG. 12) and the key 75 is turned to the ON position, the power supply circuit 78 in the vehicle electric circuit 80 operates at this timing so that the power is supplied to the vehicle coils 5a to 5d through the lead wires 6a and 6b, with the result that the generation of induction magnetic fields Φ which are laterally centered on the key rotation axis X—X and in parallel with the key rotation axis X—X is started.

The induction magnetic fields are continued for a predetermined period and thereafter ceased. During this period, the fields are magnetically coupled with the key coil 75a (see FIG. 17) disposed in the key 75 so that an induced voltage is generated in the key coil, thereby charging a capacitor constituting a power supply circuit which is not shown. Thereafter, the ID code signal generating circuit 75b (see FIG. 17) of the key which is powered by the charging voltage operates and transmits ID code information of the registered vehicle from the key coil.

The vehicle coils 5a to 5d which receive the ID code information supply the ID code information to the ID code information receiving and decoding circuit 79 (see FIG. 17), and the judgment is conducted. If it coincides with the ID code information of the present vehicle, an engine start signal is output to an engine starting circuit (not shown) so that the start of the engine is enabled.

Figure 17:
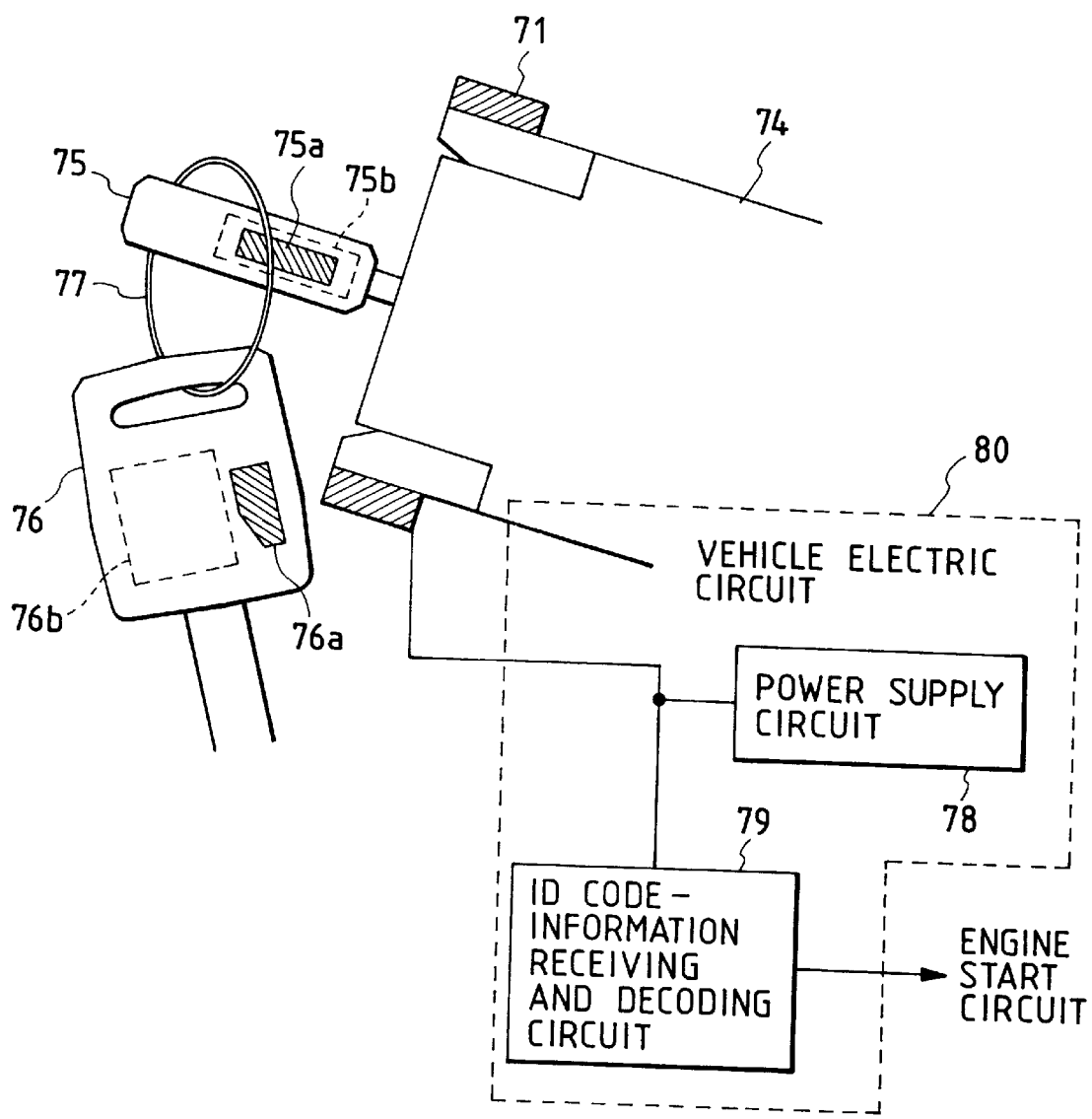
FIG. 17 is a side view showing a key insertion state in a key cylinder.

As described above, in the first embodiment, the induction magnetic fields c are generated so as to be only in lateral directions and centered on the key rotation axis X—X and in parallel with the key rotation axis X—X. Even when the key 76 for another vehicle is attached to the key holder 77 as shown in FIG. 17, therefore, the induction magnetic fields Φ do not act on the key coil 76a of the other key 76 which hangs from the key holder 77, and hence transmission of a plurality of kinds of ID code information can be surely prevented from occurring.

Figure 4:
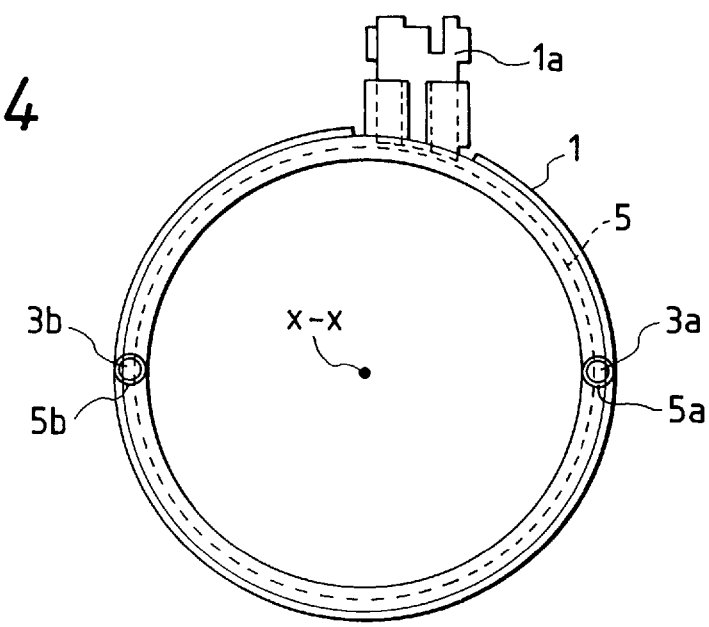
FIG. 4 is a front view showing the configuration of vehicle coils of a key device for a vehicle according to Embodiment 2 of the invention.
Figure 5:
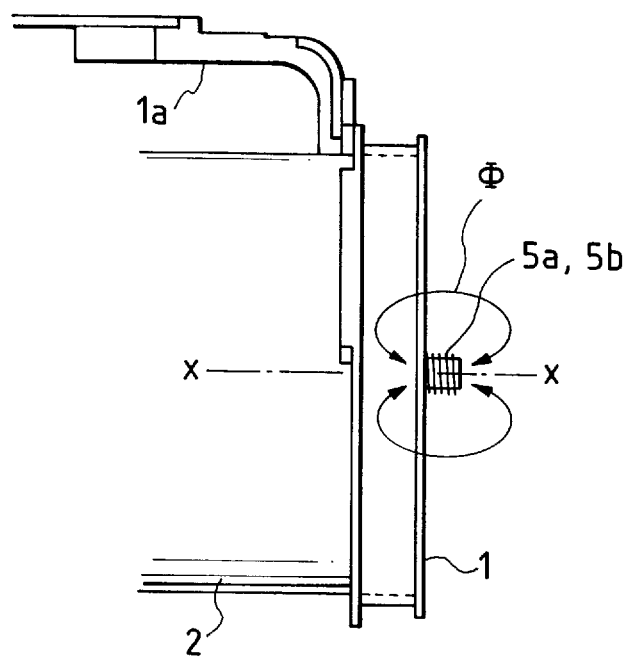
FIG. 5 is a side view showing the vehicle coils of FIG. 4.

FIGS. 4 and 5 are views showing the configuration of vehicle coils 5a and 5b in the second embodiment. In the second embodiment, cores 3a and 3b are disposed on an end face of a base ring 1 in lateral portions centered on the key rotation axis X—X, and a coil wire 5 is disposed on the end face of the base ring 1 while being wound on each of the cores 3a and 3b by a predetermined number of turns so as to form the vehicle coils 5a and 5b. According to this configuration, the necessary induction magnetic fields Φ can be obtained by the number of turns of the coil wire 5 on the cores 3a and 3b. As compared with the first embodiment, the number of the cores is smaller, the operation of winding the coil wire 5 is easier, and the configuration is simplified. Furthermore, the region where each induction magnetic field Φ is generated is narrower, and hence the induction magnetic fields Φ can be more surely prevented from acting on the key 76 for the other vehicle attached to the key holder 77.

Figure 6:
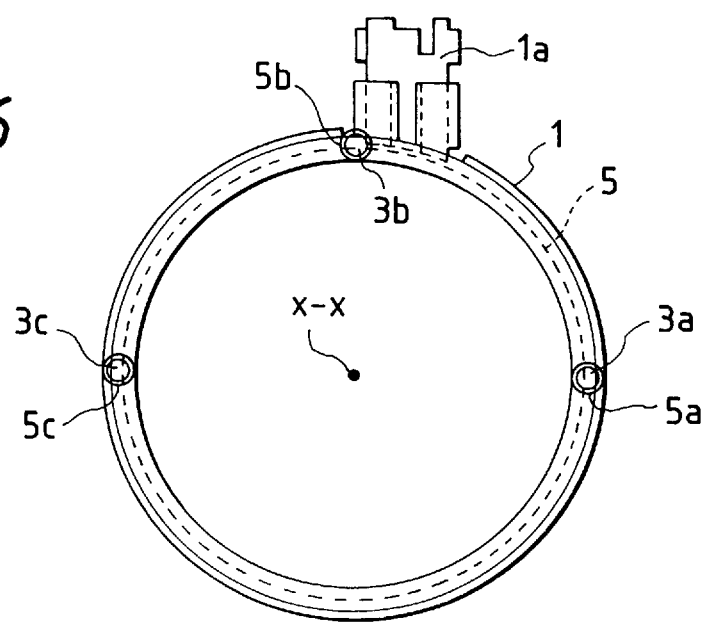
FIG. 6 is a front view showing the configuration of vehicle coils of a key device for a vehicle according to Embodiment 3 of the invention.
Figure 7:
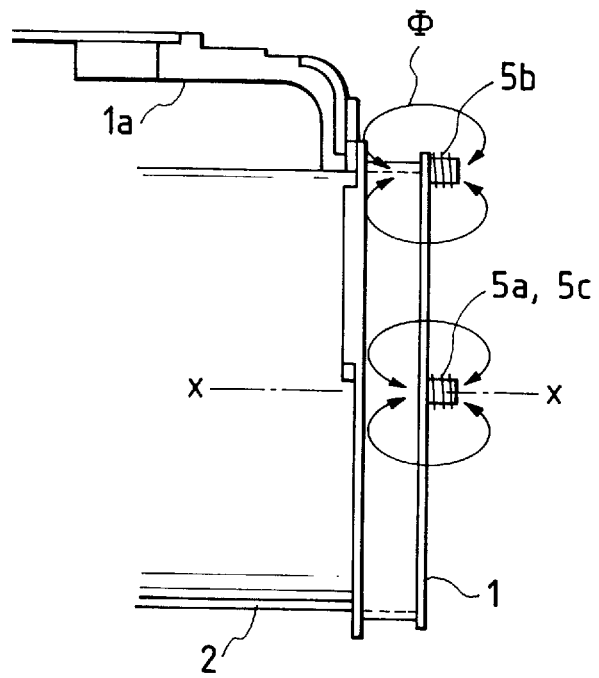
FIG. 7 is a side view showing the vehicle coils of FIG. 6.

FIGS. 6 and 7 are views showing the configuration of vehicle coils 5a to 5c showing the third embodiment. In the third embodiment, cores 3a, 3b, and 3c are respectively disposed at three positions on an end face of a base ring 1, i.e., at lateral positions centered on the key rotation axis X—X, and a position perpendicularly above the key rotation axis X—X. A coil wire 5 is disposed on the end face of the base ring 1 while being sequentially wound on each of the cores by about 40 to 60 turns so as to form the vehicle coils 5a to 5c. The other configuration is the same as that of the first embodiment, and hence duplicated description is omitted.

In the embodiment, even when the number of turns of each of the vehicle coils 5a to 5c on the cores 3a, 3b, and 3c is not so large, the sufficient induction magnetic field Φ can be generated in parallel with the key rotation axis X—X only in a region above the key rotation axis X—X. Therefore, the vehicle coils 5a to 5c on the cores 3a, 3b, and 3c are not required to increase their diameters, so that the size of the whole can be made smaller. The induction magnetic fields Φ act satisfactorily on the key coil 75a of the key 75 (see FIG. 17) inserted into the key insertion slot 2a of the key cylinder 2. Furthermore, the induction magnetic fields are not generated in the region below the key rotation axis X—X. Consequently, the induction magnetic fields Φ can be more surely prevented from acting on the key 76 for the other vehicle attached to the key holder 77.

Figure 8:
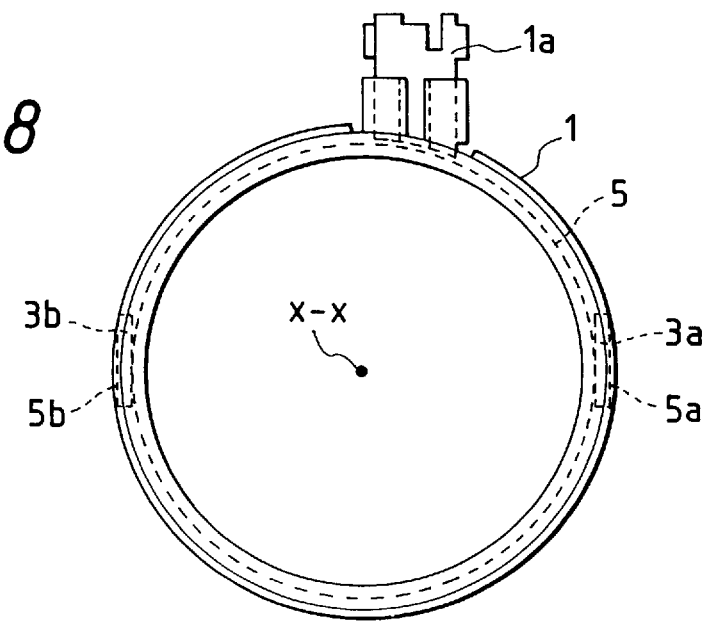
FIG. 8 is a front view showing the configuration of vehicle coils of a key device for a vehicle according to Embodiment 4 of the invention.
Figure 9:
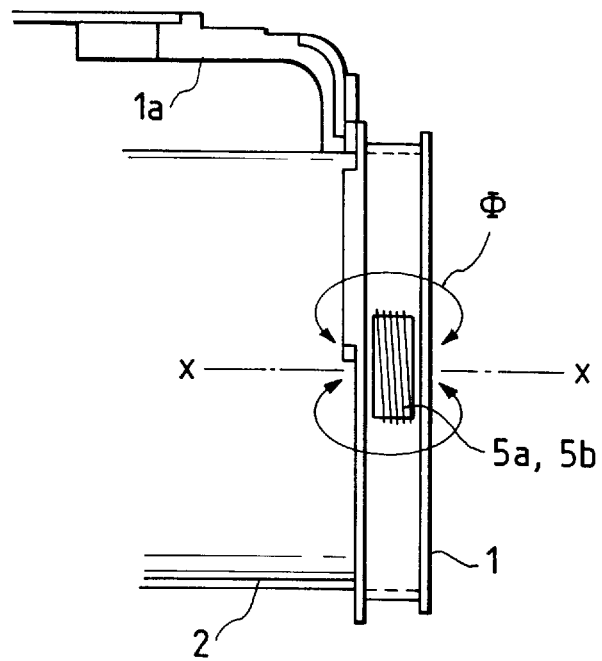
FIG. 9 is a side view showing the vehicle coils of FIG. 8.
Figure 10:
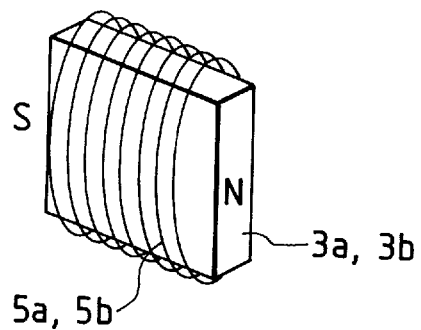
FIG. 10 is a perspective view showing relationships between the vehicle coils and cores of the key device for a vehicle according to Embodiment 4 of the invention.

FIGS. 8, 9, and 10 are views showing the configuration of vehicle coils 5a and 5b showing the fourth embodiment. In the fourth embodiment, cores 3a and 3b of a square shape on which the vehicle coils 5a and 5b are respectively wound are attached to lateral end faces of a base ring 1 centered on the key rotation axis X—X. According to the embodiment, the cores 3a and 3b can be made thin and also the vehicle coils 5a and 5b wound on the cores can be formed into a thin shape. Therefore, the vehicle coils 5a and 5b can be firmly attached to the peripheral face of the base ring 1 with a reduced degree of projection.

Figure 11:
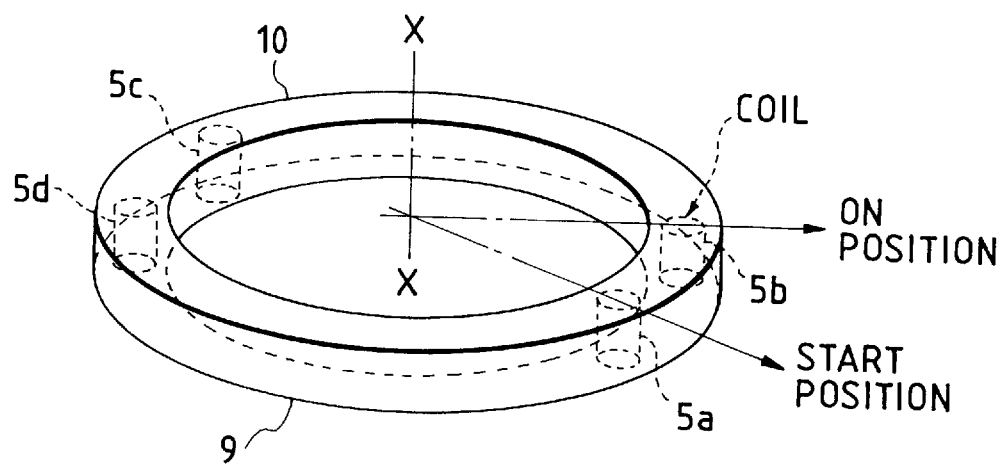
FIG. 11 is a perspective view showing the configuration of vehicle coils of a key device for a vehicle according to Embodiment 5 of the invention.

FIG. 11 is a view showing the configuration of vehicle coils 5a to 5d showing the fift embodiment. In the fifth embodiment, cores 3a, 3b, 4a, and 4b are respectively disposed in lateral positions centered on the center axis of a ring plate 9, i.e., the key rotation axis X—X. A coil wire 5 is disposed on a face of the ring plate 9 while being wound on each of the cores 3a, 3b, 4a, and 4b by about 40 to 60 turns. Thereafter, a ring plate 10 having the same shape as the ring plate 9 is placed on the cores 3a, 3b, 4a, and 4b so that the cores are held by pair of ring plates 9 and 10. The space between the ring plates 9 and 10 is filled with a resin so that the whole is integrated.

According to the configuration of this embodiment, the ring plate 9 is attached to an end face of a key cylinder 2 by fixing means such as adhesion, welding, or brazing so that the integrated vehicle coils 5a to 5d correspond to key operation positions such as START and ON positions. The attachment is simple and easy. Moreover, the positional deviation of the cores does not occur and hence stable performances can be always maintained. In the embodiment described above, the base ring 1 having a groove on the peripheral face is used. The use is not always necessary. It is a matter of course that the base ring may be always a ring-like member (for example, a resin plate of a thickness of 1 mm).

As described above, according to the invention, the key device for a vehicle comprises: a key coil disposed in a key which is to be inserted into a key cylinder of a vehicle; and vehicle coils which are disposed on the vehicle and to be magnetically coupled with the key coil to perform supply of an electric power and air-propagation communication, thereby reading code information preset in the key, and is configured in such a manner that the vehicle coils are disposed in the vicinity of a key insertion slot of the key cylinder so that an induction magnetic field is generated in a substantially upper half portion of the key insertion slot or in a pair of lateral portions on both the sides of the key cylinder. Even when a key for another vehicle is attached to the same key holder, therefore, a key coil disposed in the other key is prevented from being simultaneously subjected to an induction magnetic field. As a result, simultaneous transmission of a plurality of kinds of ID code information from plural keys is prevented from occurring. Therefore, the invention has an effect that a code-information receiving and decoding circuit of a vehicle can rapidly correctly decode received code information without producing confusion and the starting control of the engine can be adequately performed.

According to the invention, one of induction magnetic fields generated in the pair of lateral portions centered on the key rotation axis corresponds to an operation position of the key, such as the ON position. Therefore, the invention has an effect that the induction magnetic fields can be generated at positions where the fields are magnetically coupled most easily with the key coil.

According to the invention, the vehicle coils are a pair of coils respectively disposed on lateral sides of the key rotation axis. Therefore, the invention has an effect a that induction magnetic fields can be generated at positions where the fields are magnetically coupled most easily with the key coil from both the front and rear faces of the key.

According to the invention, the vehicle coils are two or more coils which are disposed on each of lateral sides of the key rotation axis. Therefore, the invention has an effect that a sufficient induction magnetic field can be generated without increasing the size of a vehicle coil.

According to the invention, the vehicle coils are formed into a cylindrical shape. Therefore, the invention has an effect that the coil wire forming the vehicle coils can be easily wound and the vehicle coils can be attached without increasing the size of the key insertion slot of the key cylinder.

According to the invention, the vehicle coils are formed into a square shape. Therefore, the invention has an effect that the vehicle coils are thinned and can be firmly attached.

I claim:

1. A key device for a vehicle, said key device being of the type which operates with a key having a key coil, said key device comprising:

a key cylinder having a key insertion slot to receive said key, said key insertion slot being surrounded by a base ring;

vehicle coils disposed on said base ring and adapted to be magnetically coupled with said key coil to perform supply of an electric power and air-propagation communication of an ID code to read ID code information preset in the key; and a code-information decoding circuit which outputs an engine start signal only when it is judged that the read ID code information coincides with a preset vehicle ID code information, wherein said vehicle coils are disposed on a substantially upper half of said base ring and extend perpendicular to the circumference of said base ring of said key cylinder so that an induction magnetic field is generated in a substantially upper half portion of said key insertion slot or in a pair of lateral portions which are centered on a key rotation axis.

2. A key device for a vehicle according to claim 1, wherein one of the induction magnetic fields generated in the pair of lateral portions corresponds to an operation position of said key.

3. A key device for a vehicle according to claim 1, wherein said vehicle coils comprises a pair of coils respectively disposed on lateral sides which are centered on the key rotation axis.

4. A key device for a vehicle according to claim 1, wherein said vehicle coils are two or more coils which are disposed on each of lateral sides which are centered on the key rotation axis.

5. A key device for a vehicle according to claim 1, wherein said vehicle coils are formed into a cylindrical shape.

6. A key device for a vehicle according to claim 1, wherein in that said vehicle coils are formed into a square shape.

7. A key device for a vehicle, said key device being of the type which operates with a key having a key coil, said key device comprising:

a key cylinder configured to receive said key;

vehicle coils which are disposed on the vehicle and to be magnetically coupled with said key coil to perform supply of an electric power and air-propagation communication of an ID code to read ID code information preset in the key; and a code-information decoding circuit which outputs an engine start signal only when it is judged that the read ID code information coincides with a preset vehicle ID code information, wherein said vehicle coils are disposed along the peripheral direction of a base ring of a key insertion slot of said key cylinder so that an induction magnetic field is generated in a substantially upper half portion of said key insertion slot or in a pair of lateral portions which are centered on a key rotation axis, wherein said vehicle coils include a coil wire disposed on an end face of said base ring and wound around a plurality of cores having ends affixed to the end face of said base ring.

8. A key device for a vehicle according to claim 1, wherein said vehicle coils are disposed on an outer periphery of said base ring.

9. A key device for a vehicle, said key device being of the type which operates with a key having a key coil, said key device comprising:

a key cylinder configured to receive said key;

vehicle coils which are disposed on the vehicle and to be magnetically coupled with said key coil to perform supply of an electric power and air-propagation communication of an ID code to read ID code information preset in the key; and a code-information decoding circuit which outputs an engine start signal only when it is judged that the read ID code information coincides with a preset vehicle ID code information, wherein said vehicle coils are disposed along the peripheral direction of a base ring of a key insertion slot of said key cylinder so that an induction magnetic field is generated in a substantially upper half portion of said key insertion slot or in a pair of lateral portions which are centered on a key rotation axis, wherein said cores are disposed symmetrically with respect to the center axis of said base ring.

* * * * *